US010680977B1

(12) United States Patent
Sarusi

(10) Patent No.: US 10,680,977 B1
(45) Date of Patent: Jun. 9, 2020

(54) SPLITTING DATA INTO AN INFORMATION VECTOR AND A CONTROL VECTOR AND PROCESSING, AT A STAGE OF A CONTROL PIPELINE, THE CONTROL VECTOR AND A DATA BLOCK OF THE INFORMATION VECTOR EXTRACTED FROM A CORRESPONDING STAGE OF A DATA PIPELINE

(71) Applicant: Amazon Technologies, Inc., Seattle, WA (US)

(72) Inventor: Adiel Sarusi, Hod Hasharon (IL)

(73) Assignee: Amazon Technologies, Inc., Seattle, WA (US)

( * ) Notice: Subject to any disclaimer, the term of this patent is extended or adjusted under 35 U.S.C. 154(b) by 284 days.

(21) Appl. No.: 15/716,367

(22) Filed: Sep. 26, 2017

(51) Int. Cl.
*H04L 12/861* (2013.01)
*G06F 9/38* (2018.01)
*H04L 12/933* (2013.01)
*H04L 12/773* (2013.01)

(52) U.S. Cl.
CPC ........ *H04L 49/9042* (2013.01); *G06F 9/3867* (2013.01); *H04L 45/60* (2013.01); *H04L 49/1546* (2013.01)

(58) Field of Classification Search
CPC .... G06F 9/3867; G06F 9/3004; G06F 9/3869; G06F 9/3828; H04L 45/00; H04L 49/1515; H04L 49/3009; H04L 49/9042; H04L 49/1546; H04L 45/60
See application file for complete search history.

(56) References Cited

U.S. PATENT DOCUMENTS

| | | | | |
|---|---|---|---|---|
| 6,246,683 | B1* | 6/2001 | Connery | H04L 49/90 370/392 |
| 6,721,316 | B1* | 4/2004 | Epps | H04L 45/60 370/360 |
| 6,917,620 | B1* | 7/2005 | Sindhu | H04L 12/5601 370/384 |
| 9,736,069 | B1* | 8/2017 | Daniel | H04L 45/74 |
| 2003/0046429 | A1* | 3/2003 | Sonksen | G06F 15/17337 709/246 |
| 2003/0152076 | A1* | 8/2003 | Lee | G06F 9/3885 370/389 |
| 2004/0100900 | A1* | 5/2004 | Lines | G06F 13/4247 370/229 |

(Continued)

*Primary Examiner* — Keith E Vicary
(74) *Attorney, Agent, or Firm* — Kilpatrick Townsend & Stockton LLP

(57) ABSTRACT

Disclosed herein are techniques for improving the performance of a pipeline in an integrated circuit. An integrated circuit includes a pipeline including a plurality of stages, and a plurality of storage circuits coupled to corresponding stages in the plurality of stages of the pipeline. A first stage of the plurality of stages is configured to split a set of data into a first vector and a second vector. The plurality of stages is configured to transport the first vector through the pipeline, and sequentially perform operations on the first vector of the set of data. The plurality of storage circuits is configured to transport the second vector among the plurality of storage circuits. Each storage circuit of the plurality of storage circuits is configured to provide a data block in the second vector to the corresponding stage in the plurality of stages of the pipeline for data processing.

20 Claims, 9 Drawing Sheets

(56) References Cited

U.S. PATENT DOCUMENTS

| | | | |
|---|---|---|---|
| 2005/0232303 A1* | 10/2005 | Deforche | H04L 49/90 370/469 |
| 2007/0153796 A1* | 7/2007 | Kesavan | H04L 67/2842 370/392 |
| 2007/0195773 A1* | 8/2007 | Tatar | H04L 49/1546 370/392 |
| 2008/0253398 A1* | 10/2008 | Calvignac | H04L 49/602 370/474 |
| 2011/0137870 A1* | 6/2011 | Feder | G06F 16/174 707/662 |
| 2012/0030451 A1* | 2/2012 | Pong | H03M 13/09 712/223 |
| 2012/0317360 A1* | 12/2012 | Zettler | G06F 12/0888 711/122 |
| 2013/0114413 A1* | 5/2013 | Song | H04L 49/9042 370/237 |
| 2018/0041614 A1* | 2/2018 | Ben-Chen | H04L 69/321 |

\* cited by examiner

SPLITTING DATA INTO AN INFORMATION VECTOR AND A CONTROL VECTOR AND PROCESSING, AT A STAGE OF A CONTROL PIPELINE, THE CONTROL VECTOR AND A DATA BLOCK OF THE INFORMATION VECTOR EXTRACTED FROM A CORRESPONDING STAGE OF A DATA PIPELINE

BACKGROUND

With the increasing amount of data to be processed and transported, there is an increasing need for a processing system that can provide significantly faster performance than existing processing systems, and more particularly, a processing system that can provide significantly faster performance than existing processing systems for a given chip size and transistor/process density.

One way to improve the performance of a processing system is to use a multi-stage pipeline structure in the processing system. In a multi-stage pipeline, each stage of the pipeline may pass data to the next stage. In general, all data from a previous stage is passed on to the subsequent stage(s) even if the subsequent stage(s) may not need all the data from the previous stage. Passing the data between the stages may require a bus with a high aggregated bandwidth, which may require individual links with a higher bandwidth or more links (wires) between the stages. In addition, each stage may need to temporarily store the data before forwarding it to the next stage. Thus, a large buffer (e.g., flip-flops) may be needed at each stage. Therefore, passing data between the stages may significantly increase the overhead for each stage and increase the complexity of the circuit in each stage, and therefore may affect the speed and latency of each stage and the overall pipeline.

BRIEF DESCRIPTION OF THE DRAWINGS

Various embodiments in accordance with the present disclosure will be described with reference to the drawings, in which.

DETAILED DESCRIPTION

Figure 1:
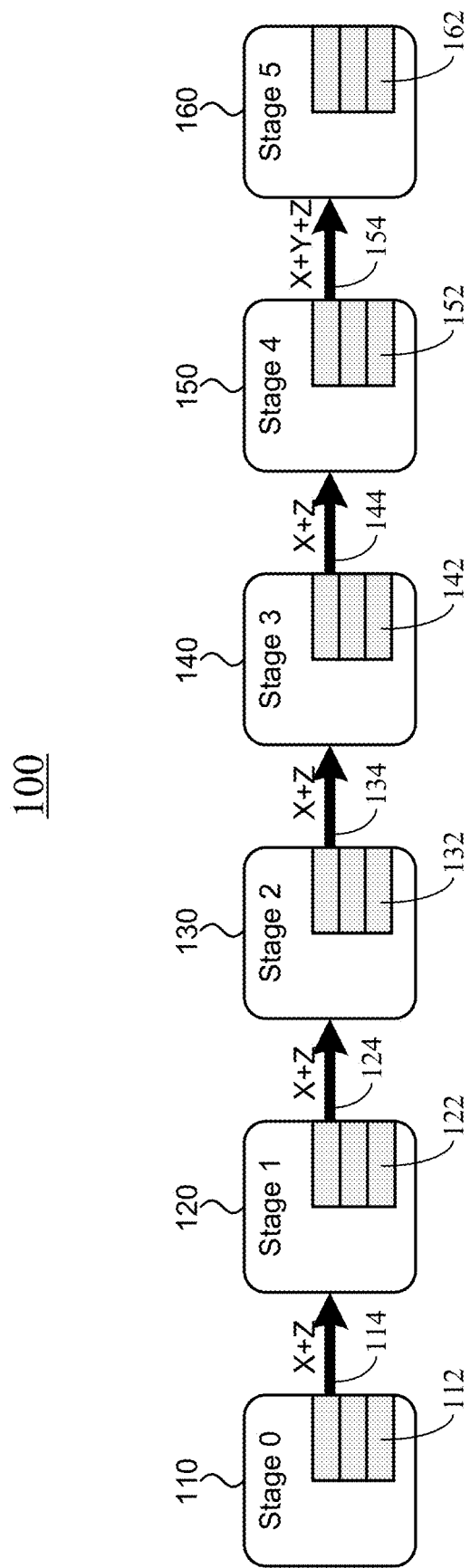
FIG. 1 illustrates an example pipeline architecture for an example processing system.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

As the amount of data to be processed and transported is increasing exponentially, there is an increasing need for a processing system (e.g., a general purpose processor or a special purpose processor, such as a network processor, a digital signal processor, or a graphic processor) that can provide significantly faster performance than existing processing systems for a given chip size and transistor/process density. For example, the demand for intelligent, increasingly complex network processing at wire speed has led to the creation of network processors that can provide system flexibility while delivering the high-performance hardware functions required to process packets at wire speed.

The performance of a processing system may be improved by using a parallel processing architecture, a multi-stage pipeline architecture, a multicore architecture, a hybrid pipeline and parallel architecture, etc. in the processing system. For example, in a network processor having a pipeline architecture, each packet may flow through the entire pipeline, where each stage of the pipeline may perform a part of the desired processing.

In general, in a multi-stage pipeline, each stage of the pipeline may pass all received data to the subsequent stage(s), even if the subsequent stage(s) may not need all the received data from the previous stage(s). For example, in a network processor, only a small portion of the received data (e.g., a part of the header of a packet) may be used in the pipeline, while most of the payload in the packet may not be used during the network processing. However, each stage of the network processor may nonetheless pass all received data including the payload to the subsequent stages. Passing the data between the stages may require a bus with a high aggregated bandwidth, which may require individual links with a higher bandwidth or more links (e.g., connection wires) between the stages. In addition, each stage may need to temporarily store the data before forwarding it to the next stage. Thus, a large buffer (e.g., flip-flops or latches) may be needed at each stage. Therefore, passing data between the stages may significantly increase the overhead for each stage and increase the complexity of the circuit in each stage, and thus may limit the speed and latency of each stage and the overall pipeline.

Techniques disclosed herein relate to a processing system that can reduce the bandwidth requirement and storage requirement in a multi-stage pipeline, and thus can reduce the complexity of the circuit and improve the speed and latency of each stage. More specifically, a pipeline structure including two or more paths may be used in the processing system. One path may be referred to as a control path, which may include multiple stages and may transport and perform the desired processing on a minimum amount of received data. Another path may be referred to as a data path, which may transport most or all of the received data outside of the control path and may provide requested data to the stages on the control path on demand. Because only a minimum amount of received data needs to be transported on the control path, buses with a lower bandwidth may be used to transport data between stages on the control path, and each stage on the control path may only use a small amount of buffer for temporary data storage. As a result, the stages on the control path may be significantly simplified and may be tailored to perform the desired data processing at a higher speed and with a lower latency.

In a processing system with a multi-stage pipeline architecture, simultaneous execution of more than one instruction or operation may take place. Each stage of the pipeline may perform different operations on a set of data, and the multiple stages may, in combination, perform all desired operations on the set of data (e.g., a network transport unit, such as a network packet, a frame, a message, or an encapsulated segment of data). Thus, each stage of the pipeline may operate sequentially on a same set of data, and may operate concurrently on different sets of data in the pipeline, rather than waiting for the processing of one set of data to complete before starting to process a different set of data. For example, a reduced instruction set computer (RISC) pipelined CPU may include an Instruction Fetch stage, an Instruction Decode stage, an Instruction Execute stage, a Memory Access stage, and a Write Back stage. In the Instruction Fetch stage, the CPU may read instructions from an address in a memory present in the program counter. In the Instruction Decode stage, the instruction may be decoded and a register file may be accessed to get the values from registers used in the instruction. In the Instruction Execute stage, arithmetic logic unit (ALU) operations may be performed. In the Memory Access stage, memory operands may be read from and/or written to the memory. In the Write Back stage, computed/fetched value may be written back to the register(s) present in the instruction. One reason for the pipeline architecture is that simple processing blocks may be able to run faster than complex ones. In addition, the overall throughput of the pipeline may be increased because of the concurrently processing at different stages.

FIG. 1 illustrates an example pipeline architecture for an example processing system 100. The pipeline of processing system 100 may have two ends, the input end and the output end. Between these two ends, there may be multiple stages, including a stage 0 (110), a stage 1 (120), a stage 2 (130), a stage 3 (140), a stage 4 (150), and a stage 5 (160). The output of one stage may be connected to the input of the next stage, and each stage may perform a specific operation. Interface registers (e.g., latches or buffers), such as a buffer 112 in stage 0, a buffer 122 in stage 1, a buffer 132 in stage 2, a buffer 142 in stage 3, a buffer 152 in stage 4, and/or a buffer 162 in stage 5, may be used to hold operands and the intermediate output between two stages. In many implementations, all stages in the pipeline including the corresponding interface registers may be controlled by a common clock to function as a synchronous system.

In processing system 100 shown in FIG. 1, all data received at the input end of the pipeline may be propagated through the pipeline. In one example, the data may be a network packet that may include a payload X and a header Z. In order to transport the data between stages in a short period of time (e.g., one or more clock cycles), a bus 114 with a high aggregated bandwidth may be used to transfer the buffered data in buffer 112 to stage 1 (120). Bus 114 may include a plurality of parallel connections between stage 0 (110) and stage 1 (120) in order to achieve the desired aggregated bandwidth for data transfer between stages. The plurality of parallel connections may occupy a fairly large real estate (silicon area) on the chip. Similarly, a bus 124 with a high aggregated bandwidth may be used to transfer the buffered data in buffer 122 to stage 2 (130), a bus 134 with a high aggregated bandwidth may be used to transfer the buffered data in buffer 132 to stage 3 (140), a bus 144 with a high aggregated bandwidth may be used to transfer the buffered data in buffer 142 to stage 4 (150), and a bus 154 with a high aggregated bandwidth may be used to transfer the buffered data in buffer 152 to stage 5 (160). Buffers 112, 122, 132, 142, 152, and 162, and buses 114, 124, 134, 144, and 154 may occupy a large silicon area on the processing system, and thus may increase the complexity of each stage of the pipeline and the delay between the stages. As a result, the speed of each stage of the processing system may be limited and the latency of the pipeline may be increased.

In telecommunications networks, information (e.g., voice, video, data) is generally transferred as packets. The processing of these packets has led to the creation of network processors that are optimized to process packet data. A network processor is an integrated circuit specifically targeted at networking applications to enhance and optimize packet processing within the telecommunication networks. Network processors can be used in many different types of network equipment, such as routers, switches, firewalls, session border controllers, intrusion detection devices, intrusion prevention devices, and network monitoring systems.

A network processor may include a number of features or functions. For example, a network processor may be able to find specific patterns of bits or bytes within packets in a packet stream (pattern matching), look up a database using a key (e.g., an address in a packet) to find a result (e.g., routing information) (key lookup), and/or change certain data fields in the packet as it is being processed (data field manipulation). A network processor may also be configured to perform operations such as computation, queue management, processing control and orchestration, allocation and re-circulation of packet buffers, packet or frame discrimination and forwarding, and quality of service (QoS) enforcement (identifying different types or classes of packets and providing preferential treatment for some types or classes of packets at the expense of other types or classes of packets). Some network processors may also perform access control functions to determine whether a specific packet or stream of packets should be allowed to traverse a piece of network equipment. Some network processors may include built-in hardware-based encryption engines that allow individual data flows to be encrypted by the network processors.

In order to provide the desired processing performance, a network processor may include one or more task-customized processors (rather than generic RISC processors). Each processor of the one or more task-customized processors may be tailored to perform a specific networking operation as described above. Task-customized processors may be much more compact than the generic processors. Moreover, the instruction set used to perform the functions of each individual processor may be a small portion (e.g., less than 10%) of the instruction set for RISC processors. In addition to the optimization of the instruction set, the data path within each task-customized processor may also be tailored to the particular networking operations (or features) of the task-customized processor. Hence, a network processor may include two or more task-customized processors in a multi-stage pipeline, where each task-customized processor may have a specialized data path and a specialized instruction set. Consequently, the packet processing at each stage may be performed faster using a task-customized processor that is more compact and takes up less silicon area on the chip.

These fast and efficient processors may be integrated in a super-scalar architecture that is designed and optimized for packet-processing tasks.

Figure 2:
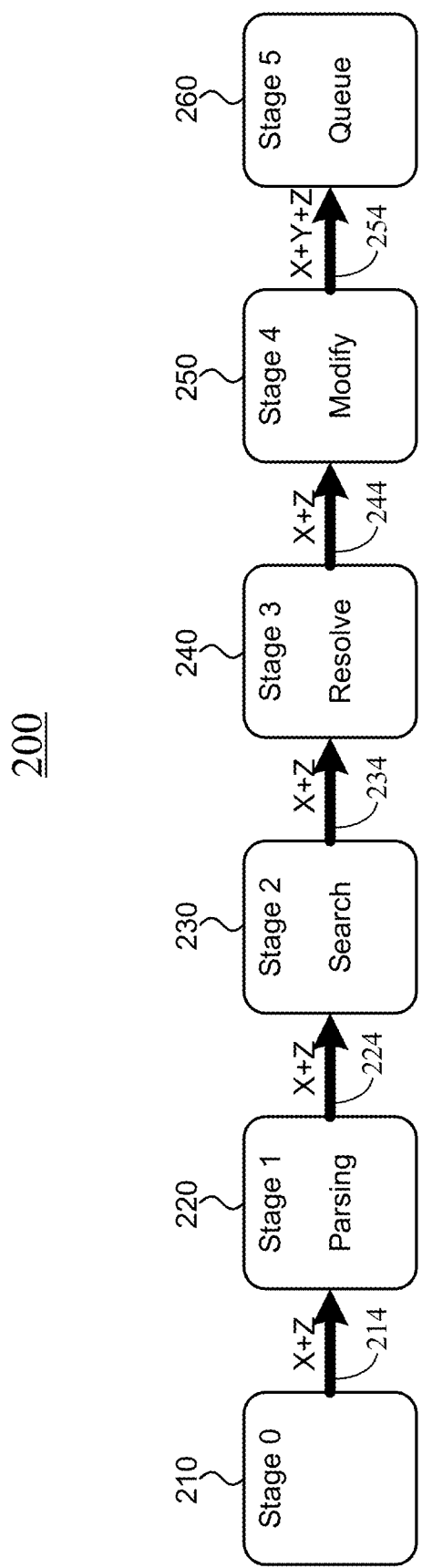
FIG. 2 illustrates an example multi-stage pipeline in an example network processor.

FIG. 2 illustrates an example multi-stage pipeline 200 in an example network processor. As the pipeline architecture for example processing system 100, multi-stage pipeline 200 in the example network processor may include a stage 0 (210), a stage 1 (220), a stage 2 (230), a stage 3 (240), a stage 4 (250), and a stage 5 (260). These stages may be coupled together by buses 214, 224, 234, 244, and 254. Each stage may include a buffer (not shown) to temporarily store data passed on from the previous stage, and/or operands and intermediate output of the stage.

In multi-stage pipeline 200 shown in FIG. 2, stage 0 (210) may include a link controller, and stage 1 (220) may be a parsing stage. Data packets may be transferred to parsing stage 1 (220) from link controller of stage 0 (210). In parsing stage 1 (220), the packet header(s) and the payload may be separated, and the contents of the packet header(s) and the fields of the packet headers may be extracted and analyzed. The parsing stage 1 (220) may be capable of handling different OSI packet layers including payload fields with dynamic offsets and length.

Stage 2 (230) may be a searching stage. Searching stage 2 (230) may receive search keys, which may be the fields extracted by parsing stage 1 (220), and then perform various table look-ups required, for example, for layer 2 switching, layer 3 routing, layer 4 session switching, and layers 5-7 content switching and policy enforcement. In some implementations, searching stage 2 (230) may need to access memory to acquire the look-up tables and store the look-up tables in a local memory (e.g., a cache).

After the various search and match operations have been completed, searching stage 2 (230) may forward the search results to stage 3 (240), which may be a resolution stage. Resolution stage 3 (240) may make the decision for packet handling. For example, in resolution stage 3 (240), a packet may be assigned to an appropriate output port via a queue and/or a switch matrix, packet history information may be stored, and content changes may be decided. In multicast applications, the packet may be forwarded to multiple ports.

The packet may then be conveyed to stage 4 (250), which may be a modification stage that may modify the packet (e.g. overwrite, remove, or insert certain fields within the packet) if needed. The modified packet may be sent to stage 5 (260), which may forward the packet to the appropriate output port via the queue and/or the switch matrix.

As the general pipeline architecture for example processing system 100, multi-stage pipeline 200 may transport all data received at the input end of the pipeline through the pipeline. Thus, each stage of the pipeline may need a large buffer to store the packet and a wide bus to propagate the buffered data. The buffers and buses may occupy a large silicon area on a chip, and may increase the complexity of each stage of the pipeline and the delay between the stage. Thus, the speed of each stage of the pipeline may be limited and the latency of the pipeline may be increased.

Techniques disclosed herein provide solutions to the above-discussed issues of the general pipeline architecture by using a pipeline including two or more parallel paths. One path may be referred to as a control path, which may transport and perform the desired processing on a minimum amount of received data. Another path may be referred to as a data path, which may transport most or all of the received data outside of the control path and provide requested data to the stages on the control path on demand. Thus, buses with a lower bandwidth may be used to transport data between stages on the control path. Each stage on the control path may only need to access data that is needed for the data processing at the stage, and thus may only use a small amount of buffer for temporary data storage. The circuit that responds to the request for data from the stages on the control path and extracts the requested data from the data path can be implemented outside of the control path as well. As a result, the stages on the control path may be significantly simplified and may be tailored to perform the desired data processing at a higher speed and with a lower latency. In addition, data transferring on the data path can be accomplished over a longer period of time (e.g., about the processing time of a stage on the control path), and thus the bandwidth of the buses on the data path can be lower. As such, the number of links on the data path or the bandwidth requirement of each individual link can be reduced, which means that the area used for routing the links can be reduced and the routing can be done with less restrictions. Furthermore, most or all of the received data may be stored in low cost storage devices (e.g., a memory device such as a DRAM) rather than buffers (e.g., flip-flops). Therefore, the cost of the processing system can be reduced as well.

Figure 3:
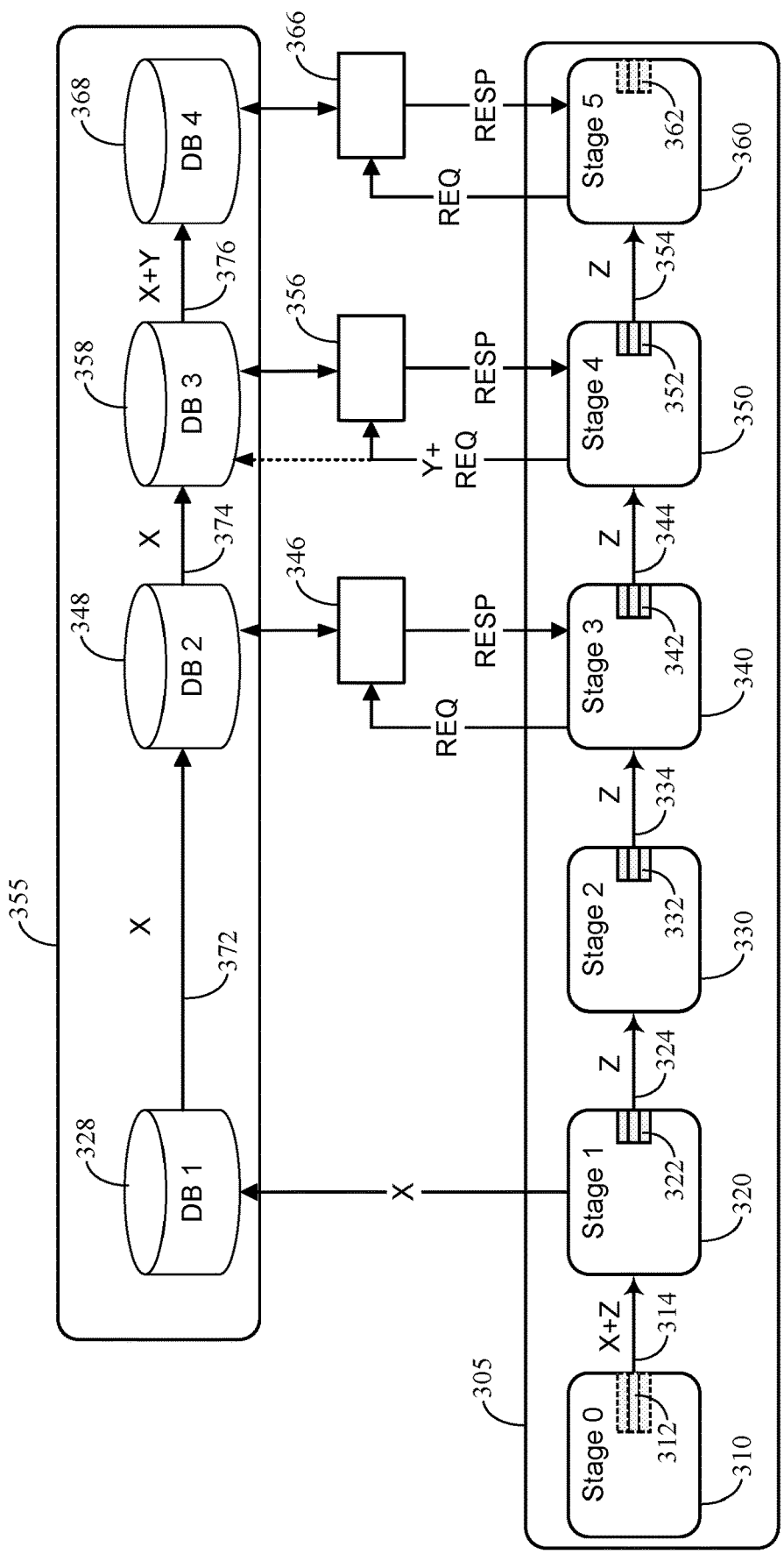
FIG. 3 illustrates an example multi-stage processing system with a data path and a control path, according to certain embodiments.

FIG. 3 illustrates an example multi-stage processing system 300 with a control path 305 and a data path 355, according to certain embodiments. On control path 305, a stage 0 (310) may transfer a first set of received data to a stage 1 (320) using a bus 314. The first set of received data may include a data block Z that may be used at every stage on the control path, and a data block X that may not be used at every stage on the control path. Stage 0 (310) may or may not include a buffer 312. For example, in some embodiments, stage 0 (310) may allow received data to pass through without storing the received data.

Stage 1 (320) may receive data from stage 0 (310) and separate the received data into data block X and data block Z. Data block X may be sent to a database 1 (328) on data path 355. Database 1 (328) may be stored in any suitable storage device, such as a random-access memory (RAM), a storage class memory (SCM), a flash memory, or other storage circuits. Database 1 (328) may be large enough to store data block X from one or more sets of received data. At least a portion of data block Z may be temporarily stored in a buffer 322 and be used for data processing operations at stage 1 (320). Buffer 322 may include flip-flops (e.g., D flip-flops or T flip-flops) or latches (e.g., D-latches or SR latches). At the end of the data processing operations at stage 1 (320), data block Z of the received data may be passed on to a stage 2 (330) on control path 305 using a bus 324.

Stage 2 (330) may receive data block Z from stage 1 (320) and temporarily store at least a portion of data block Z in a buffer 332. Stage 2 (330) may use data block Z for data processing operations at stage 2 (330). At the end of the operations at stage 2 (330), data block Z of the received data may be passed on to a stage 3 (340) on control path 305 using a bus 334. In the example shown in FIG. 3, stage 2 (330) may only use data block Z for the data processing operations. Thus, stage 2 (330) may not need to access any data in data block X, and hence a database or storage device for stage 2 (330) may not be needed on data path 355. As such, data block X in the first set of received data may be sent from database 1 (328) to database 2 (348) on data path 355 that corresponds to stage 3 (340) on control path 305 using a bus 372. Data block X may be replicated in database 2 (348) at any time before stage 3 (340) may use data in data block X for processing. In other words, the data transfer time between databases 1 (328) and database 2 (348) may be as long as the total processing time of stage 1 (320) and stage 2 (330). Therefore, bus 372 may be implemented using a bus having a lower aggregated bandwidth. For example, bus 372 may include a lower number of links and/or individual links at a lower speed. In some implementations where database 1 (328) may only hold data block X for a set of received data, after data block X for a first set of received data is replicated in database 2 (348), data block X of the first set of received data may be removed from database 1 (328) or may be overwritten by data block X of the next set of received data.

Stage 3 (340) may receive data block Z from stage 2 (330) and temporarily store at least a portion of data block Z in a buffer 342. Stage 3 (340) may use data block Z for data processing operations at stage 3 (340). Stage 3 (340) may also use additional data in data block X for data processing operations. To access the additional data in data portion X, stage 3 (340) may request data from database 2 (348) where data block X is stored. A data extraction circuit 346 may receive the request, extract the requested data from database 2 (348), and send the extracted data to stage 3 (340) for processing. Data extraction circuit 346 may be a part of data path 355 or may be a circuit outside of data path 355. Stage 3 (340) may perform the desired processing operations using data block Z and the additional data acquired on-demand from data block X. After the data processing operations, stage 3 (340) may send data block Z to stage 4 (350) using a bus 344. After the requested data is extracted from data block X in database 2 (348), data block X for the first set of received data may be sent to a database 3 (358) corresponding to stage 4 (350) using a bus 374. In some implementations, after data block X for the first set of received data is replicated in database 3 (358), data block X for the first set of received data may be removed from database 2 (348) or may be overwritten by data block X of the next set of received data in database 2 (348).

Stage 4 (350) on control path 305 may receive data block Z from stage 3 (340) and temporarily store at least a portion of data block Z in a buffer 352. Stage 4 (350) may use data block Z for data processing operations. Stage 4 (350) may also use additional data in data block X for data processing operations. To access the additional data in data portion X, stage 4 (350) may request data from database 3 (358) where data block X is stored. A data extraction circuit 356 may receive the request, extract the requested data from database 3 (358), and send the extracted data to stage 4 (350) for processing. As data extraction circuit 346, data extraction circuit 356 may be a part of data path 355 or may be a circuit outside of data path 355. Stage 4 (350) may perform the desired processing operations using data block Z and the additional data acquired on-demand from data block X. During the data processing operations, stage 4 (350) may generate a new data block Y, which may be an additional data block to be added to data block X or a replacement data block for replacing a portion of data block X. Stage 4 (350) may send the new data block Y to data extraction circuit 356, which may write new data block Y to database 3 (358). In some embodiments, stage 4 (350) may send new data block Y to database 3 (358) directly, which may include a circuit that receives new data block and add the new data block to the database. After the intended data processing operations, stage 4 (350) may send data block Z to stage 5 (360) using a bus 354. Data block X for the first set of received data and the new data portion Y may be sent to a database 4 (368) corresponding to stage 5 (360) on control path 305 using a bus 376. In some implementations, after data block X for the first set of received data and the new data block Y are replicated in database 4 (368), data block X of the first set of received data and the new data block Y may be removed from database 3 (358) or may be overwritten by data block X and new data block Y for the next set of received data in database 3 (358).

Stage 5 (360) may receive data block Z from stage 4 (350) and use data block Z for data processing operations. Stage 5 (360) may also use additional data in data block X or new data block Y for data processing operations. To access the additional data in data portion X and/or data block Y, stage 5 (360) may request data from database 4 (368) where data block X and data block Y are stored. A data extraction circuit 366 may receive the request, extract the requested data from database 4 (368), and send the extracted data to stage 5 (360) for processing. Data extraction circuit 366 may be a part of data path 355 or may be a circuit outside of data path 355. Stage 5 (360) may perform the desired processing operations using data block Z and the additional data acquired on-demand from database 4 (368). If stage 5 (360) is the last stage on control path 305, the operations of multi-stage processing system 300 may end at stage 5 (360), which may send the final processing results to other circuits. If stage 5 (360) is not the last stage on control path 305, stage 5 (360) may temporarily store data block Z at a buffer 362 and send data block Z to the next stage on control path 305, and data portion X and data block Y in database 4 (368) may be passed on to another database corresponding to the next stage on control path 305.

Thus, a minimum amount of data (e.g., only data that may be used by every stage on the control path) may be propagated on control path 305. As such, only a small buffer may be used at each stage to temporarily store the minimum amount of data. Data that may not be needed at every stage on the control path may be stored in one or more low cost, high density storage devices, such as a RAM, an SCM, or a flash memory, or other storage circuits, that may operate at a lower speed than the buffer. Data transferring between the one or more storage devices may be performed at a slower speed than the required speed to transfer the same data on the control path. The stages on control path may only request additional data from the one or more storage devices when necessary. The data extraction circuit may be outside of the control path. Thus, the circuits in and between the stages on the control path may be significantly reduced or simplified, and therefore may be optimized for maximum processing speed and throughput.

The above described techniques may be implemented using a synchronous pipeline architecture or an asynchronous pipeline architecture. For example, processing system 300 may include a buffered synchronous pipeline, where the buffers and the pipeline stages are clocked synchronously based on a common reference clock such that changes in the state of memory elements (e.g., buffers, flip-flops, or latches) are synchronized. In some implementations, processing system 300 may include a buffered asynchronous pipeline, where the buffers and the pipeline stages may not be clocked synchronously based on a common reference clock. In some implementations of the buffered asynchronous pipeline, a present stage may send a ready signal to the next stage before sending data to the next stage, and the next stage may return an acknowledgement signal to the present stage after receiving the data from the present stage.

Figure 4:
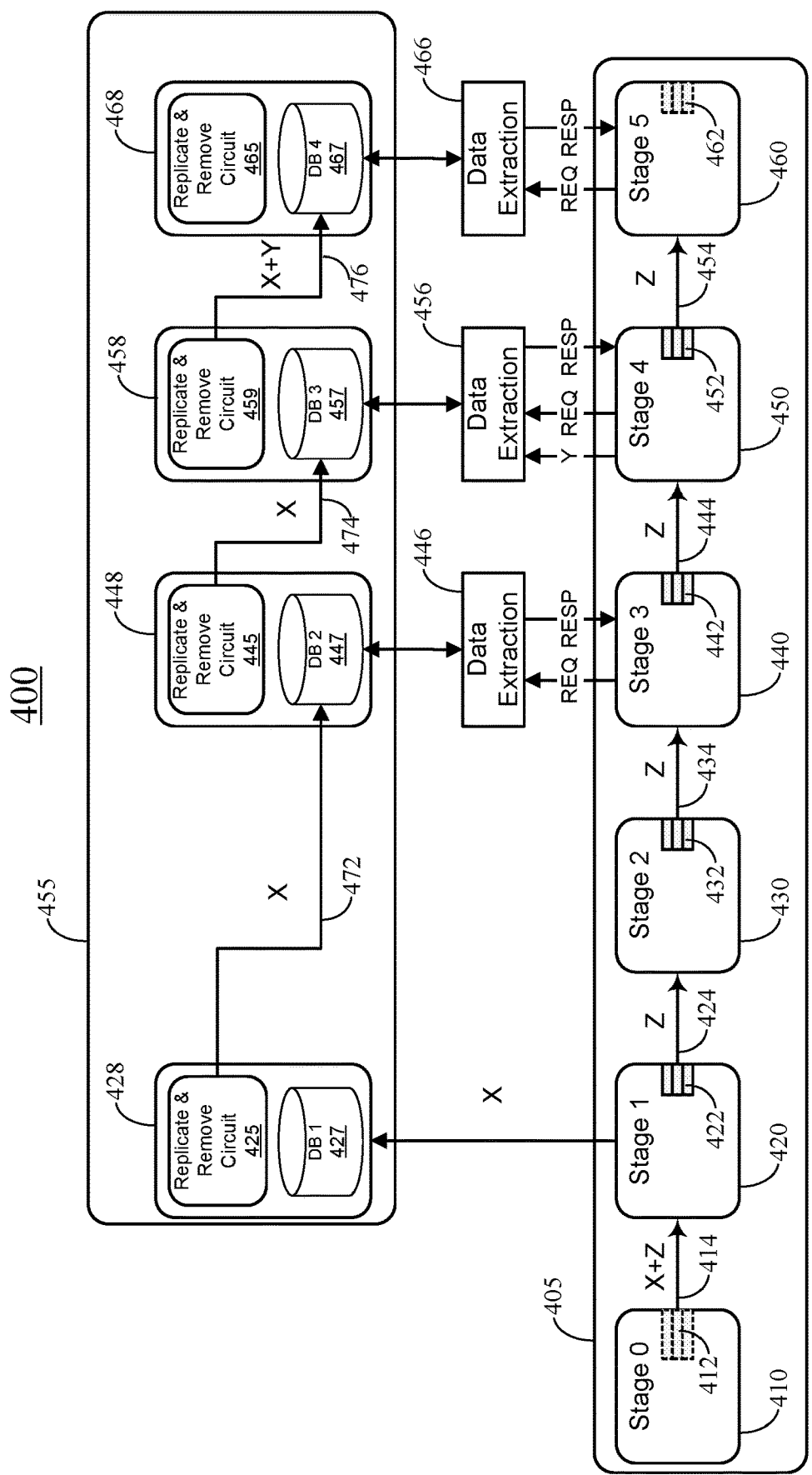
FIG. 4 illustrates an example processing system using a dual-path synchronous pipeline structure, according to certain embodiments.

FIG. 4 illustrates an example processing system 400 using a dual-path synchronous pipeline architecture, according to certain embodiments. In processing system 400, all circuits may operate based on a common reference clock and thus are synchronized. As processing system 300 of FIG. 3, processing system 400 may include a control path 405 and a data path 455. Control path 405 may include a stage 0

(410), a stage 1 (420), a stage 2 (430), a stage 3 (440), a stage 4 (450), and a stage 5 (460). Stage 1 (420), stage 2 (430), stage 3 (440), and stage 4 (450) may each include a buffer 422, a buffer 432, a buffer 442, or a buffer 452. Stage 0 (410) and stage 5 (460) may be at the input end and the output end of the pipeline, respectively, and may or may not include a buffer 412 or a buffer 462. Stage 0 (410) may transfer each set of received data to stage 1 (420). Stage 1 (420), stage 2 (430), stage 3 (440), stage 4 (450), and stage 5 (460) may perform different operations on the received data. The buffer at each stage on control path 405 may include flip-flops or latches for storing a minimum amount of data that may be used by each of stages 1-5. Adjacent stages on control path 405 may be coupled to each other by a bus 414, a bus 424, a bus 434, a bus 444, or a bus 454.

Stage 1 (420) may split each set of received data into a data block Z and a data block X, and send data block X to data path 455. Data block X may be transported on data path 455, and may be requested by the stages on control path 405 as needed. Data path 455 may include one or more storage circuits, such as a storage circuit 428, a storage circuit 448, a storage circuit 458, and a storage circuit 468. Each of the storage circuits may include a memory device that may host a database. The memory device may include, for example, an SRAM, a DRAM, an SCM, or a flash memory. Each of the storage circuits may also include a replicate and remove circuit. The replicate and remove circuits may copy data block X from one memory device (or database) to the next memory device on the data path, and may optionally remove the data block X that has been copied to the next memory device from the current memory device.

Storage circuit 428 may correspond to stage 1 (420), and may include a database 1 (427) and a replicate and remove circuit 425. Database 1 (427) may be used to store data block X from a set of received data split by stage 1 (420) at a time. Replicate and remove circuit 425 may copy data block X from database 1 (427) to storage circuit 448 using a bus 472. Storage circuit 448 may correspond to stage 3 (440), and may include a database 2 (447) and a replicate and remove circuit 445. Database 2 (447) may be used to store data block X of a set of received data replicated from database 1 (427) at a time. Replicate and remove circuit 445 may copy data block X from database 2 (447) to storage circuit 458 using a bus 474. Storage circuit 458 may correspond to stage 4 (450), and may include a database 3 (457) and a replicate and remove circuit 459. Database 3 (457) may be used to store data block X of a set of received data replicated from database 2 (447) at a time. In addition, storage circuit 458 may receive a new data block Y generated by stage 4 (450). New data block Y may replace (or modify) a portion of data block X or may include additional data to be saved in database 3 (457). Replicate and remove circuit 459 may copy data block X and new data block Y from database 3 (457) to storage circuit 468 using a bus 476. Storage circuit 468 may correspond to stage 5 (460) of control path 405, and may include a database 4 (467) and a replicate and remove circuit 465. Database 4 (467) may be used to store data block X and new data block Y for a set of received data replicated from database 3 (457) at a time. Replicate and remove circuit 465 may copy data block X and new data block Y from database 4 (467) to a storage circuit for a next stage on control path 405. If stage 5 (460) is the last stage on control path 405, replicate and remove circuit 465 may remove data block X and new data block Y from database 4 (467). It is noted that stage 2 (430) on control path 405 may only need data block Z for the data processing operations, and therefore a storage circuit may not be used for stage 2 (430). In some implementations, storage circuit 428 may not be used, and data block X from stage 1 (420) may be directly written into database 2 (447) in storage circuit 448. In some implementations, a storage circuit may only be used for a stage on the control path that may request additional data, while new data generated by a stage on the control path may be directly written to the storage circuit for the next stage.

Processing system 400 may also include a plurality of data extraction circuits between control path 405 and data path 455, such as a data extraction circuit 446 between stage 3 (440) and storage circuit 448, a data extraction circuit 456 between stage 4 (450) and storage circuit 458, and a data extraction circuit 466 between stage 5 (460) and storage circuit 468. In some implementations, at least a part of data extraction circuits 446, 456, and 466 may be included in data path 455 or control path 405. Data extraction circuits 446, 456, and 466 may receive data request from stage 3 (440), stage 4 (450), or stage 5 (460) on control path 405, extract requested data from corresponding database 2 (447), database 3 (457), or database 4 (467), and send the extracted data to corresponding stage 3 (440), stage 4 (450), or stage 5 (460) as a response to the data request. Some data extraction circuits, such as data extraction circuit 456, may respond to a write request from the corresponding stage on the control path and write new data into the corresponding database or replace a data block in the corresponding database. Because all circuits, including the stages and the buffers on control path, storage circuits on the data path, and the data extraction circuits, may operate based on a common reference clock and thus are synchronized, the circuits can be designed such that, during a time period, appropriate data may be in the storage circuit corresponding to the stage on the control path that may request data from the storage circuit, while data from other sets of received data may be at other storage circuits during the time period. As such, it may not be necessary to identify the specific set of received data that the requested data may be extracted from or the new data may be added to or modify.

Figure 5:
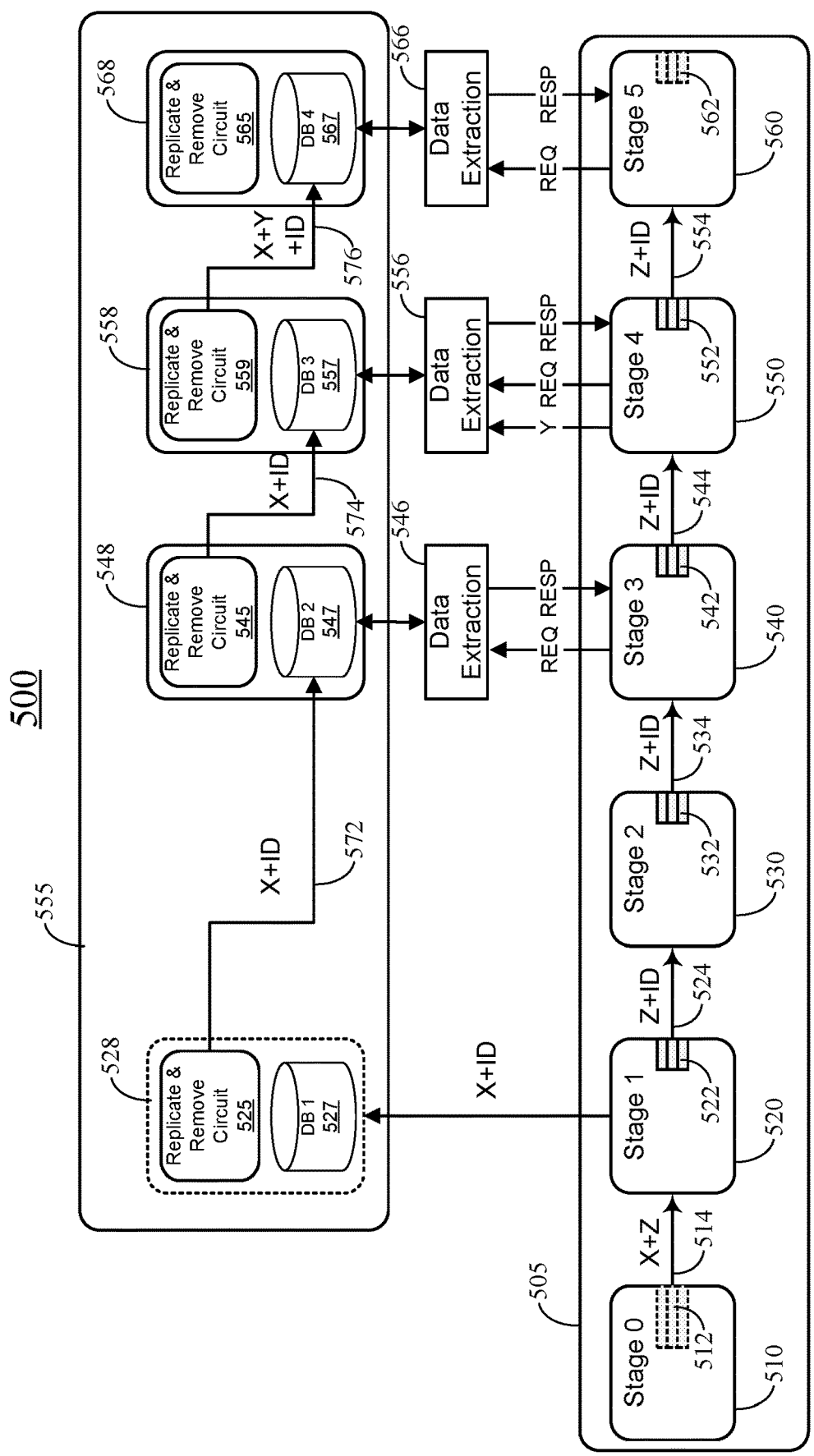
FIG. 5 illustrates an example processing system using a dual-path pipeline structure, according to certain embodiments.

FIG. 5 illustrates an example processing system 500 using a dual-path pipeline architecture, according to certain embodiments. The dual-path pipeline in processing system 500 may be either asynchronous or synchronous. As processing system 400 of FIG. 4, processing system 500 may include a control path 505 and a data path 555. Control path 505 may include a stage 0 (510), a stage 1 (520), a stage 2 (530), a stage 3 (540), a stage 4 (550), and a stage 5 (560). Stage 1 (520), stage 2 (530), stage 3 (540), and stage 4 (550) may each include a buffer 522, a buffer 532, a buffer 542, or a buffer 552. Stage 0 (510) and stage 5 (560) may be at the input end and the output end of the pipeline, respectively, and may or may not include a buffer 512 or a buffer 562. Stage 0 (510) may transfer each set of received data to stage 1 (520). Stage 1 (520), stage 2 (530), stage 3 (540), stage 4 (550), and stage 5 (560) may perform different operations on each set of received data. The buffer at each stage on control path 505 may include flip-flops or latches for storing a minimum amount of data that may be used by each of stages 1-5. Adjacent stages on control path 505 may be coupled to each other by a bus 514, a bus 524, a bus 534, a bus 544, or a bus 554.

Stage 1 (520) may assign an identification (ID) to each set of received data, split each set of received data into a data block Z and a data block X, store data block Z and the corresponding ID to buffer 522, and send data block X and the corresponding ID to data path 555. Data block Z and the corresponding ID may be transported on control path 505, where each stage on control path 505 may temporarily store data block Z and the corresponding ID in a buffer before forwarding them to the next stage. Data block X and the corresponding ID may be transported on data path 555, and may be requested by the stages on control path 505 as needed. Data path 555 may include one or more storage circuits, such as a storage circuit 528, a storage circuit 548, a storage circuit 558, and a storage circuit 568. Each of the storage circuits may include a memory device that may host a database. The memory device may include, for example, an SRAM, a DRAM, an SCM, or a flash memory. Each memory device may be large enough to store data block X and the corresponding ID for one or more sets of received data. Each of the storage circuits may also include a replicate and remove circuit. The replicate and remove circuit may copy data block X and the corresponding ID from one memory device (or database) to the next memory device on the data path, and may optionally remove the data block X and the corresponding ID that have been copied to the next memory device from the current memory device.

Storage circuit 528 may correspond to stage 1 (520), and may include a database 1 (527) and a replicate and remove circuit 525. Database 1 (527) may be used to store data block X and the corresponding ID for one or more sets of received data split by stage 1 (520). Replicate and remove circuit 525 may copy data block X and the corresponding ID of a set of received data from database 1 (527) to storage circuit 548 using a bus 572. Storage circuit 548 may correspond to stage 3 (540), and may include a database 2 (547) and a replicate and remove circuit 545. Database 2 (547) may be used to store data block X and the corresponding ID of one or more sets of received data replicated from database 1 (527). Replicate and remove circuit 545 may copy data block X and the corresponding ID of a set of received data from database 2 (547) to storage circuit 558 using a bus 574. Storage circuit 558 may correspond to stage 4 (550), and may include a database 3 (557) and a replicate and remove circuit 559. Database 3 (557) may be used to store data block X and the corresponding ID of one or more sets of received data replicated from database 2 (547). In addition, storage circuit 558 may receive new data block Y generated by stage 4 (550). New data block Y may replace (or modify) a portion of data block X or may include additional data to be saved in database 3 (557). Replicate and remove circuit 559 may copy data block X and the corresponding ID for a set of received data and new data block Y from database 3 (557) to storage circuit 568 using a bus 576. Storage circuit 568 may correspond to stage 5 (560) of control path 505, and may include a database 4 (567) and a replicate and remove circuit 565. Database 4 (567) may be used to store data block X, the corresponding ID, and new data block Y for one or more sets of received data replicated from database 3 (557). Replicate and remove circuit 565 may copy data block X, the corresponding ID, and new data block Y for a set of received data from database 4 (567) to a storage circuit for a next stage on control path 505. If stage 5 (560) is the last stage on control path 505, replicate and remove circuit 565 may remove data block X, the corresponding ID, and new data block Y from database 5 (567). Stage 2 (530) on control path 505 may only use data block Z for the data processing operations, and therefore a storage circuit may not be used for stage 2 (530). In some implementations, a storage circuit may only be used for a stage on the control path that may request additional data, and new data generated by a stage on the control path may be directly written to the storage circuit for the next stage.

Processing system 500 may also include a plurality of data extraction circuits between control path 505 and data path 555, such as a data extraction circuit 546 between stage 3 (540) and storage circuit 548, a data extraction circuit 556 between stage 4 (550) and storage circuit 558, and a data extraction circuit 566 between stage 5 (560) and storage circuit 568. In some implementations, at least a part of data extraction circuits 546, 556, and 566 may be included in data path 555 or control path 505. Data extraction circuits 546, 556, and 566 may receive data request from stage 3 (540), stage 4 (550), or stage 5 (560) on control path 505. The request may include the ID of the set of received data from which the requested data is to be extracted, and the relative location (e.g., address or offset) of the requested data in data block X of the set of received data. The data extraction circuits may extract requested data from corresponding database 2 (547), database 3 (557), or database 4 (567), and send the extracted data to corresponding stage 3 (540), stage 4 (550), or stage 5 (560) on control path 505 as a response to the data request. Some data extraction circuits, such as data extraction circuit 556, may respond to a write request from the corresponding stage on control path 505 and write new data into the corresponding database or replace a portion of data in the corresponding database. Because each set of received data is associated with an ID and data can be extracted from the corresponding database based on the ID, the dual-path pipeline of processing system 500 may be either asynchronous or synchronous.

There may be many different ways to implement the data extraction circuits for reading or writing to the storage circuits by the stages on the control path. In some implementations, the data extraction circuits may be similar to a memory controller. Some data extraction circuits may only be used to extract data from the storage circuits. Some data extraction circuits may facilitate both data extraction from the storage circuits and writing data to the storage circuits. Thus, the data extraction circuits in a processing system may include same or different circuits, and may be tailored for optimized performance and/or minimum silicon real estate usage.

Figure 6:
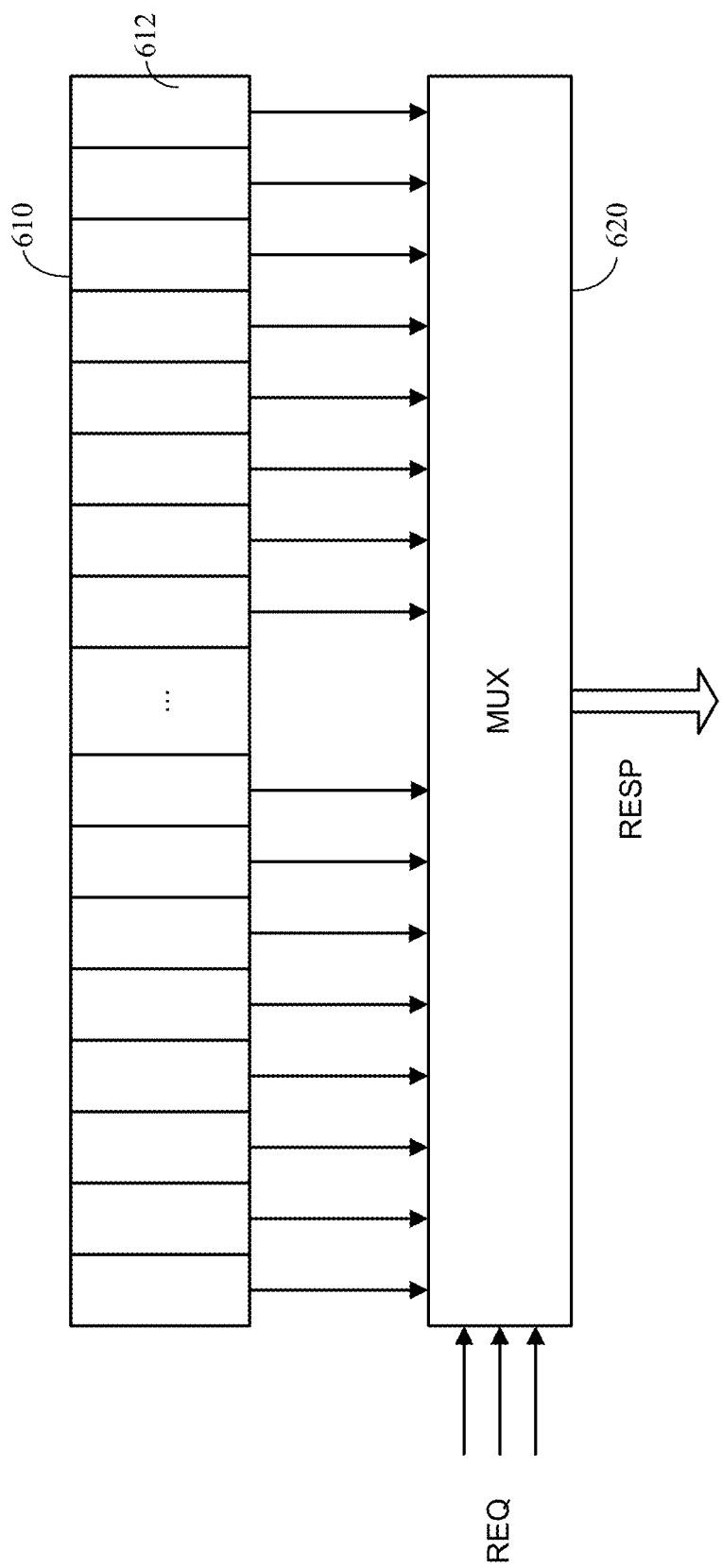
FIG. 6 illustrates an example data extraction circuit in a dual-path multi-stage processing system, according to certain embodiments.

FIG. 6 illustrates an example data extraction circuit in a dual-path multi-stage processing system, such as processing system 300, 400, or 500, according to certain embodiments. In the example shown in FIG. 6, the data extract circuit may include a multiplexer (MUX) 620. Mux 620 may be coupled to each addressable unit 612 (e.g., bit, byte, block, etc.) of a storage device 610, which may include a storage circuit, such as a RAM, a DRAM, an SRAM, an SCM, a flash memory, flip-flops, latches, or any other form of storage or buffer circuit. The request from a stage on the control path of the processing system may include the location (e.g., address or offset) of the requested data, which may be used as the selection signals to select the appropriate addressable units in storage device 610. Data in the selected addressable units in storage device 610 may be passed on to the output of MUX 620 and sent to the requesting stage as the response to the request. In some implementations, the request may also include the ID of the set of data from which the requested data is to be extracted. The ID may also be used as a part of the selection signals to select the requested data. MUX 620 may be used to implement, for example, data extraction circuits 346, 366, 446, 466, 546, and 566. In some embodiments, data extraction circuits 356, 456, and 556 may be implemented using a multiplexer/demultiplexer.

Figure 7:
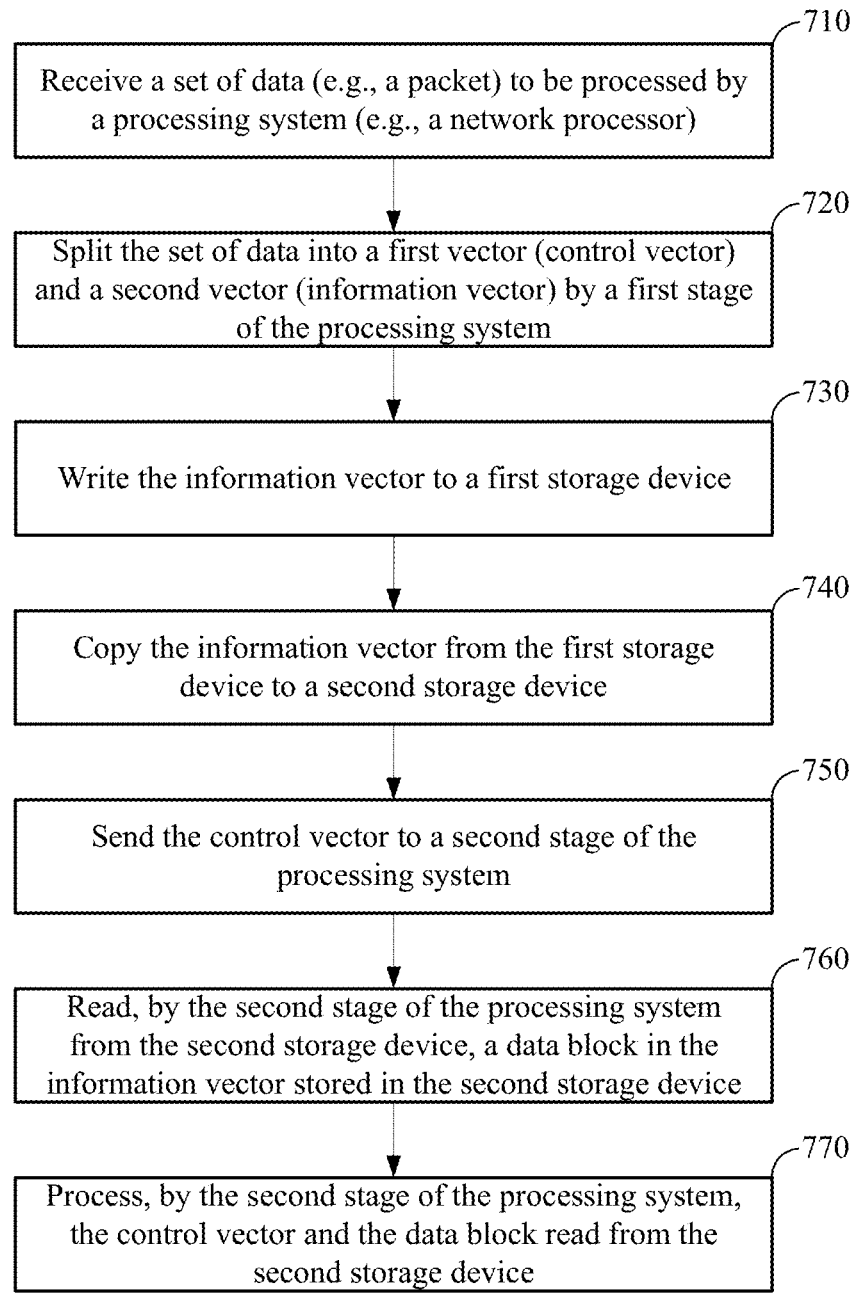
FIG. 7 is a simplified flow chart illustrating an example method for reducing bandwidth requirement in a pipeline of a processing system, according to certain embodiments.

FIG. 7 is a simplified flow chart 700 illustrating an example method for reducing bandwidth requirement in a pipeline of a processing system, such as a network processor, according to certain embodiments. The pipeline may include a plurality of stages, where each stage of the plurality of stages may perform different data processing operations. The method may be performed by the processing systems described above, such as, for example, processing systems 300, 400, and 500.

At block 710, the processing system (e.g., a network processor) may receive a set of data (e.g., a network transport unit, such as a network packet, a frame, a message, or an encapsulated segment of data) to be processed by the processing system. The processing system may receive a plurality of sets of data in a queue, and may process multiple sets of data concurrently in a pipeline. Each stage of the pipeline may process one set of data at a time, and may process different sets of data during different time periods.

At block 720, a first stage of the pipeline of the processing system may analyze the set of data, and split the set of data into a first vector (which may be referred to as a control vector) (e.g., data block Z) and a second vector (which may be referred to as an information vector) (e.g., data block X). The control vector may only include the data that may be used by all or most stages of the pipeline. For example, the control vector may only include the header or a part of the header of a data packet. The rest of the data in the set of data (e.g., the payload of a data packet) may be included in the information vector. In some implementations, a unique identification (ID) may be assigned to the set of data by, for example, the first stage of the pipeline of the processing system. The ID may be used to identify the set of data during the processing by the processing system. The first stage of the processing system may temporarily store the control vector (and the ID if assigned) in a buffer including, for example, flip-flips or latches.

At block 730, the first stage of the pipeline of the processing system may write the information vector to a first storage device. The first storage device may include a memory device, such as a DRAM, an SRAM, an SCM, or a flash memory. The first storage device may be large enough to store the information vector for one or more sets of data. In some implementations where an ID is assigned to each set of data, the ID of the set of data may be written to the first storage device as well.

At block 740, the first storage device may copy the information vector (and the ID if assigned) from the first storage device to a second storage device. The first storage device may include a replicate and remove circuit that is configured to copy the information vector, and, in some implementations, remove the information vector from the memory device of the first storage device after copying the information vector such that the memory device may be used to store the information vector for a subsequent set of data. The copying of the information vector from the first storage device to the second storage device may be performed in multiple clock cycles at a lower speed and/or on a narrow bus.

At block 750, the first stage of the pipeline of the processing system may send the control vector (and the corresponding ID if assigned) to a second stage of the pipeline of the processing system. The first stage may perform some data processing operations on the control vector, and may send the control vector to the second stage after performing the data processing operations. Afterwards, the first stage may begin to analyze a new set of data in the queue and perform the operations described above with respect to blocks 720, 730, and 750.

At block 760, the second stage of the pipeline of the processing system may receive the control vector (and the corresponding ID) from the first stage and store the received control vector (and the corresponding ID) in a buffer at the second stage. The second stage may also request from the second storage device an additional data block in the information vector stored in the second storage device. The request may include the relative location of the additional data block in the information vector and, optionally, the corresponding ID of the set of data. In some implementations, the second stage may request the additional data block from the second storage device through a data extraction circuit, such as any of the data extract circuits described above with respect to FIGS. 3-6. The data extraction circuit may select the requested data from the second storage device and send the requested data to the second stage of the pipeline in the processing system.

At block 770, the second stage of the pipeline of the processing system may process the control vector passed on from the first stage and the data block read from the second storage device. In some implementations, the second stage may generate new data to be added to the information vector or new data to replace a portion of the information vector. The second stage may write the new data to the second storage device using the data extraction circuit.

The second stage of the pipeline of the processing system may send the control vector (and the corresponding ID if assigned) to a third stage of the pipeline of the processing system. The information vector (and the ID) may also be copied from the second storage device to a third storage device corresponding to the third stage and may be removed from the second storage device by the replicate and remove circuit as described above with respect to block 740. The third stage may request data from the third storage device and process the requested data together with the control vector as described above with respect to blocks 760 and 770. At one or more stages of the pipeline of the processing system, no additional data block from the information vector may be used, and therefore storage devices may not be used for such stages. The information vector may thus be copied from a storage device corresponding to a previous stage to a storage device corresponding to a next stage, without using a storage device for the present stage. This may allow more time for the information vector to be copied from one storage device to another.

Even though FIG. 7 describes the example method as sequential operations, some of the operations may be performed in parallel or concurrently. For example, operations at block 740 and 750 may be performed in parallel. Some operations may be performed in a different order. An operation may have additional steps not included in the figure. Some operations may be optional, and thus may be omitted in various embodiments. Some operations may be performed together with another operation. Furthermore, embodiments of the methods may be implemented in hardware, software, firmware, middleware, microcode, hardware description languages, or any combination thereof.

Techniques disclosed herein may also be used in a software pipeline. For example, in some cases, to process a large data block, each stage of the software pipeline may only operate on a portion of the large data block. The large data block may be split into a first data block and a second data block, where the first data block may be used by all or most stages of the software pipeline. Each stage of the software pipeline may only use a small space in a cache to store the first data block for processing. The second data block may be stored at a lower speed memory device, and may be accessed on demand to load a portion of the second data block into the cache for data processing when necessary.

Figure 8:
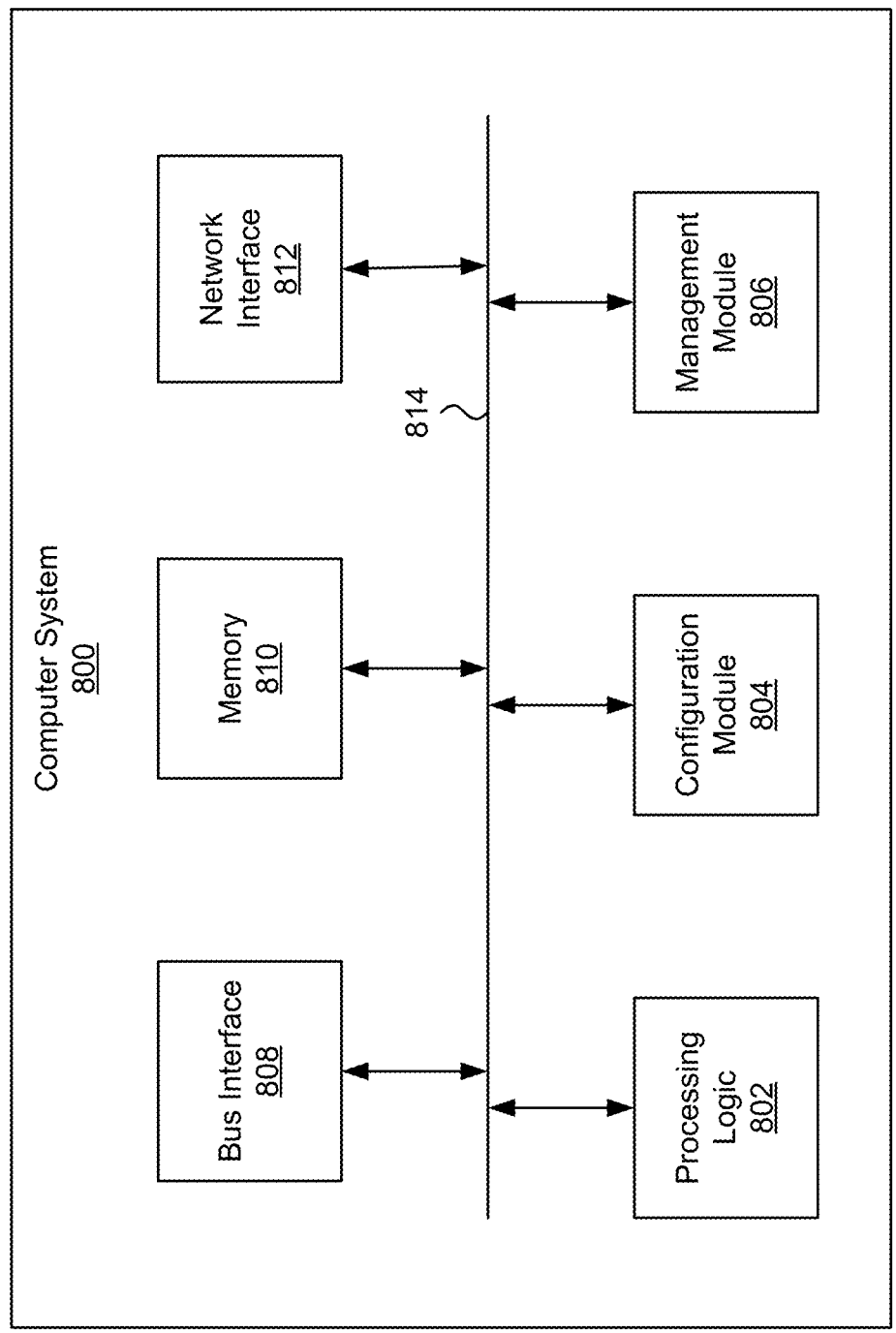
FIG. 8 illustrates an example of a computer system, according to certain aspects of the disclosure.

FIG. 8 illustrates an example of a computer system 800 that may use the dual-path pipeline structure described above. Functionality and/or several components of the computer system 800 may be used without limitation with other embodiments disclosed elsewhere in this disclosure, without limitations. For example, computer system 800 may function as a network device that may facilitate processing of packets and/or forwarding of packets from the computer system 800 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computer system 800 may be the recipient and/or generator of packets. In some implementations, the computer system 800 may modify the contents of the packet before forwarding the packet to another device. The computer system 800 may be a peripheral device coupled to another computer device, a switch, a router or any other suitable device enabled for receiving and forwarding packets.

In one example, the computer system 800 may include processing logic 802, a configuration module 804, a management module 806, a bus interface module 808, memory 810, and a network interface module 812. These modules may be hardware modules, software modules, or a combination of hardware and software. In certain instances, modules may be interchangeably used with components or engines, without deviating from the scope of the disclosure. The computer system 800 may include additional modules, not illustrated here, such as components discussed with respect to the nodes disclosed in FIG. 9. In some implementations, the computer system 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel.

The processing logic 802 may use the dual-path pipeline structure described above. The processing logic 802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810.

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the computer system 800, while in other cases some or all of the memory may be external to the computer system 800. The memory 810 may store an operating system comprising executable instructions that, when executed by the processing logic 802, provides the execution environment for executing instructions providing networking functionality for the computer system 800. The memory may also store and maintain several data structures and routing tables for facilitating the functionality of the computer system 800.

In some implementations, the configuration module 804 may include one or more configuration registers. Configuration registers may control the operations of the computer system 800. In some implementations, one or more bits in the configuration register can represent certain capabilities of the computer system 800. Configuration registers may be programmed by instructions executing in the processing logic 802, and/or by an external entity, such as a host device, an operating system executing on a host device, and/or a remote device. The configuration module 804 may further include hardware and/or software that control the operations of the computer system 800.

In some implementations, the management module 806 may be configured to manage different components of the computer system 800. In some cases, the management module 806 may configure one or more bits in one or more configuration registers at power up, to enable or disable certain capabilities of the computer system 800. In certain implementations, the management module 806 may use processing resources from the processing logic 802. In other implementations, the management module 806 may have processing logic similar to the processing logic 802, but segmented away or implemented on a different power plane than the processing logic 802.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the computer system 800 may include multiple bus interface modules for communicating with multiple external entities. These multiple bus interface modules may implement the same local bus protocol, different local bus protocols, or a combination of the same and different bus protocols.

The network interface module 812 may include hardware and/or software for communicating with a network. This network interface module 812 may, for example, include physical connectors or physical ports for wired connection to a network, and/or antennas for wireless communication to a network. The network interface module 812 may further include hardware and/or software configured to implement a network protocol stack. The network interface module 812 may communicate with the network using a network protocol, such as for example TCP/IP, InfiniBand, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computer system 800 may include multiple network interface modules, each configured to communicate with a different network. For example, in these implementations, the computer system 800 may include a network interface module for communicating with a wired Ethernet network, a wireless 802.11 network, a cellular network, an InfiniBand network, etc.

The various components and modules of the computer system 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 9.

Figure 9:
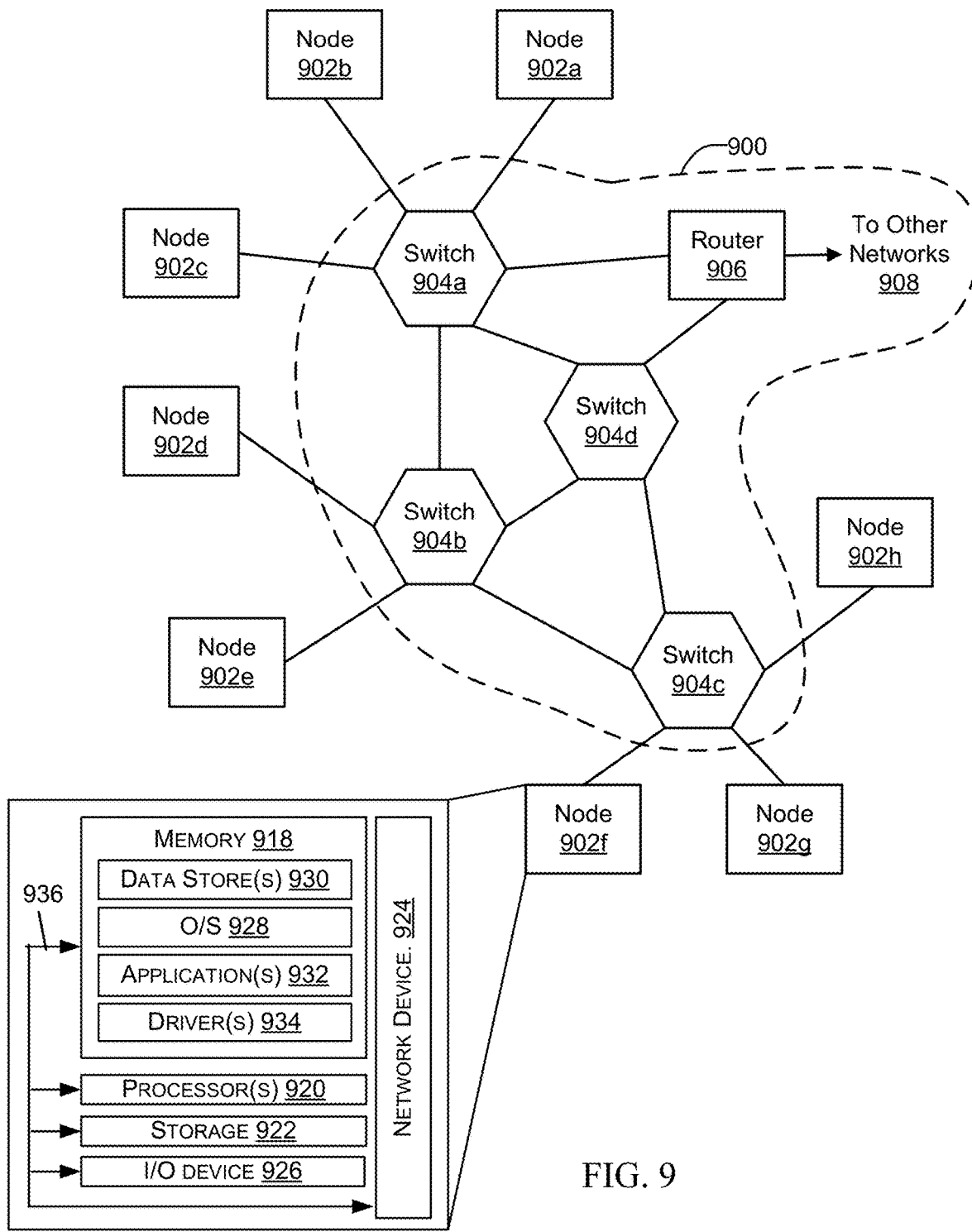
FIG. 9 illustrates an example architecture for features and systems described herein that includes one or more service provider computers and/or a user device connected via one or more networks, according to certain aspects of the disclosure.

FIG. 9 illustrates a network 900, illustrating various different types of computer systems 800 (e.g., network devices) of FIG. 8, such as nodes comprising the network device, switches and routers. In certain embodiments, the network 900 may be based on a switched architecture with point-to-point links. As illustrated in FIG. 9, the network 900 includes a plurality of switches 904a-904d, which may be arranged in a network. In some cases, the switches are arranged in a multi-layered network, such as a Clos network. A computer system 800 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 904a-904d may be connected to a plurality of nodes 902a-902h and provide multiple paths between any two nodes.

The network 900 may also include one or more computer systems 800 for connection with other networks 908, such as other subnets, LANs, wide area networks (WANs), or the Internet, and may be referred to as routers 906. Routers use headers and forwarding tables to determine the best path for forwarding the packets, and use protocols such as internet control message protocol (ICMP) to communicate with each other and configure the best route between any two devices.

In some examples, network(s) 900 may include any one or a combination of many different types of networks, such as cable networks, the Internet, wireless networks, cellular networks and other private and/or public networks. Interconnected switches 904a-904d and router 906, if present, may be referred to as a switch fabric, a fabric, a network fabric, or simply a network. In the context of a computer network, terms "fabric" and "network" may be used interchangeably herein.

Nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more applications 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application(s) 932, or drivers 934. Examples of such data include web pages, video data, audio data, images, user data, and so on. The information in the data stores 930 may, in some implementations, be provided over the network(s) 908 to user devices. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between applications 932 and the operating system 928, and/or applications 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900. The network device(s) 924 of FIG. 9 may include similar components discussed with reference to the computer system 800 of FIG. 8.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 808 may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A data processing system comprising:
   a processing pipeline including a plurality of processing stages;
   a data transferring pipeline for reducing data transportation and data storage in the processing pipeline to reduce complexity and improve performance of the plurality of processing stages, the data transferring pipeline including a plurality of storage circuits; and a plurality of data extraction circuits, each data extraction circuit coupled to a corresponding processing stage in the processing pipeline and a corresponding storage circuit in the data transferring pipeline, wherein:
a first processing stage of the plurality of processing stages is configured to split each set of data of a plurality of sets of data into a first vector and a second vector, and write the second vector to a first storage circuit of the plurality of storage circuits;

the plurality of processing stages is configured to transport the first vector but not the second vector of each set of data through the processing pipeline to reduce data transportation and data storage in the processing pipeline;

the plurality of processing stages is further configured to sequentially perform operations on the first vector of each set of data and concurrently perform operations on first vectors of two or more sets of data;

the plurality of storage circuits is configured to transport the second vector of each set of data through the data transferring pipeline; and each data extraction circuit is configured to, at a request of the corresponding processing stage,
extract a data block in the second vector of each set of data from the corresponding storage circuit; and
send the extracted data block to the corresponding processing stage for processing.

2. The data processing system of claim 1, wherein:
the first vector of each set of data is used by each processing stage of the plurality of processing stages to perform an operation; and
each processing stage of the plurality of processing stages includes a buffer for storing the first vector of each set of data.

3. The data processing system of claim 1, wherein the first processing stage is further configured to:
assign a unique identification (ID) to each set of data of the plurality of sets of data;
write the unique ID for each set of data of the plurality of sets of data to a first storage circuit of the plurality of storage circuits; and
send the first vector and the unique ID for each set of data of the plurality of sets of data to a second processing stage of the plurality of processing stages.

4. The data processing system of claim 1, wherein each storage circuit of the plurality of storage circuits includes:
a memory device configured to store the second vector of a set of data; and
a circuit configured to:
copy the second vector of the set of data to a subsequent storage circuit of the plurality of storage circuits; and
delete the second vector of the set of data from the memory device.

5. An integrated circuit, comprising:
a pipeline including a plurality of stages, wherein:
a first stage of the plurality of stages is configured to split a set of data into a first vector and a second vector;
the plurality of stages is configured to transport the first vector through the pipeline; and
the plurality of stages is further configured to sequentially perform operations on the first vector of the set of data; and a plurality of storage devices coupled to corresponding stages in the plurality of stages of the pipeline, wherein:
the plurality of storage devices is configured to transport the second vector among the plurality of storage devices; and
each storage device of the plurality of storage devices is configured to provide a data block in the second vector to a corresponding stage in the plurality of stages of the pipeline for data processing.

6. The integrated circuit of claim 5, wherein the first vector is used by each stage of the plurality of stages to perform an operation.

7. The integrated circuit of claim 5, wherein each stage of the plurality of stages includes a buffer for storing at least a portion of the first vector.

8. The integrated circuit of claim 5, wherein the first stage of the plurality of stages is configured to:
assign an identification (ID) to the set of data;
write the second vector and the ID to a first storage device of the plurality of storage devices; and
send the first vector and the ID to a second stage of the plurality of stages.

9. The integrated circuit of claim 5, further comprising a plurality of data extraction circuits, wherein:
each data extraction circuit is coupled to a corresponding stage of the plurality of stages in the pipeline and a corresponding storage device in the plurality of storage devices; and
each data extraction circuit is configured to, at a request of the corresponding stage,
extract a data block in the second vector from the corresponding storage device; and
send the extracted data block to the corresponding stage for processing.

10. The integrated circuit of claim 9, wherein:
a data extraction circuit of the plurality of data extraction circuits is configured to write data from the corresponding stage into the corresponding storage device.

11. The integrated circuit of claim 9, wherein a data extraction circuit of the plurality of data extraction circuits includes a multiplexer.

12. The integrated circuit of claim 5, wherein each storage device of the plurality of storage devices includes:
a memory device configured to store the second vector; and
a circuit configured to:
copy the second vector to a subsequent storage device of the plurality of storage devices; and
delete the second vector from the memory device.

13. The integrated circuit of claim 12, wherein the memory device includes a dynamic random-access memory (DRAM), a static random-access memory (SRAM), a storage class memory (SCM), or a flash memory.

14. The integrated circuit of claim 5, wherein the plurality of stages in the pipeline and the plurality of storage devices are synchronized.

15. The integrated circuit of claim 5, wherein:
the integrated circuit includes a network processor; and
the set of data includes a network transport unit.

16. A computer-implemented method, comprising:
receiving a set of data to be processed by a processing system, the processing system including a plurality of stages in a pipeline;
splitting the set of data into a control vector and an information vector by a first stage of the plurality of stages in the pipeline;
writing the information vector to a first storage device;

copying the information vector from the first storage device to a second storage device;

sending the control vector to a second stage of the plurality of stages in the pipeline;

reading, by the second stage of the plurality of stages from the second storage device, a data block in the information vector stored in the second storage device; and processing, by the second stage of the plurality of stages, the control vector and the data block read from the second storage device.

17. The computer-implemented method of claim 16, wherein:

the control vector is stored in a buffer in each stage of the plurality of stages in the pipeline and is used by each stage of the plurality of stages in the pipeline for data processing.

18. The computer-implemented method of claim 16, further comprising:

assigning an identification (ID) to the set of data;

writing the ID to the first storage device; and sending the ID to the second stage of the plurality of stages.

19. The computer-implemented method of claim 18, wherein reading the data block in the information vector stored in the second storage device includes sending a request by the second stage, the request including the ID of the set of data.

20. The computer-implemented method of claim 16, further comprising:

deleting the information vector from the first storage device after copying the information vector from the first storage device to the second storage device.

* * * * *